(12) United States Patent
Wei et al.

(10) Patent No.: US 8,333,531 B1
(45) Date of Patent: Dec. 18, 2012

(54) COUPLING DEVICE

(75) Inventors: Yuan Yan Wei, Haimen (CN); Clive Coote, Barnet (GB)

(73) Assignee: Vertical Leisure Ltd., Potters Bar (GB)

( * ) Notice: Subject to any disclaimer, the term of this patent is extended or adjusted under 35 U.S.C. 154(b) by 259 days.

(21) Appl. No.: 12/502,614

(22) Filed: Jul. 14, 2009

(51) Int. Cl.
*F16B 7/10* (2006.01)

(52) U.S. Cl. .................. 403/379.6; 403/297; 403/379.3

(58) Field of Classification Search ............... 403/109.4, 403/109.5, 109.6, 294, 297, 377, 378, 379.1, 403/379.3, 379.6, 43, 48, 292; 16/427; 482/33, 482/907
See application file for complete search history.

(56) References Cited

U.S. PATENT DOCUMENTS

| | | | | |
|---|---|---|---|---|
| 2,618,675 | A * | 11/1952 | Lallmang | 439/758 |
| 2,952,484 | A | 9/1960 | Zoltok | |
| 2,997,317 | A | 8/1961 | Scott | |
| 3,514,135 | A * | 5/1970 | Cooper | 403/297 |
| 3,598,349 | A * | 8/1971 | Drake | 403/292 |
| 3,829,824 | A * | 8/1974 | Pillischafske | 403/48 |
| 4,440,518 | A * | 4/1984 | Davlantes | 403/297 |
| 4,671,478 | A * | 6/1987 | Schoenig et al. | 403/297 |
| 4,859,109 | A * | 8/1989 | Targetti | 403/297 |
| 5,203,135 | A * | 4/1993 | Bastian | 403/297 |
| 5,860,253 | A * | 1/1999 | Lapointe | 403/297 |
| D561,274 | S * | 2/2008 | Turner et al. | D21/679 |
| 7,938,593 | B1 * | 5/2011 | Young | 403/297 |
| 2002/0007612 | A1 | 1/2002 | Gierss | |

FOREIGN PATENT DOCUMENTS

| | | |
|---|---|---|
| GB | 2106212 | 9/1982 |
| JP | 3-163206 * | 7/1991 |
| WO | 9221886 | 12/1992 |

OTHER PUBLICATIONS

"X-Pole: Professional Portable Exercise & Dance Pole," X-Pole leaflet2.indd, Vertical Leisure Ltd., Oct. 11, 2005, pp. 1-8.

* cited by examiner

*Primary Examiner* — Michael P Ferguson
(74) *Attorney, Agent, or Firm* — BainwoodHuang

(57) ABSTRACT

A coupling device 1 for releasably coupling first and second axially aligned hollow tubes 10 and 11 end to end. The coupling device comprises a substantially cylindrical body 2 that is adapted to be received within the adjacent ends of the first and second tubes 10 and 11, wherein the device includes an adjustment mechanism 3 operable for radially expanding and contracting the cylindrical body 2. In an expanded state of the cylindrical body 2, the coupling device forms a friction joint with each of the tubes, locking the tubes relative to each other. The cylindrical body 2 includes one or two longitudinal slots 4 to allow expansion and contraction of the cylindrical body. The coupling device is particularly used for the joining of pole sections of dance exercise poles.

15 Claims, 3 Drawing Sheets

US 8,333,531 B1

COUPLING DEVICE

FIELD OF THE INVENTION

The present invention relates to a coupling device. In particular, it relates to a coupling device for dance exercise poles.

BACKGROUND OF THE INVENTION

Poles for use in dance exercise have become very popular in recent years. Such poles may be referred to as dance exercise poles or pole dancing poles. Such poles extend between floor and ceiling and generally comprise at least two hollow tubes connected together in series according to the height required. The poles may be erected and dismantled by coupling or decoupling the hollow tubes. To facilitate coupling and decoupling, joints are provided between the tubes. There are presently two forms of joint used, screw joints and insert joints, both of which suffer from drawbacks.

Screw joints are expensive to manufacture, since they require an insert to be welded into the end of a tube and a finishing operation. During use, when a pole becomes warm, the tubes and joint can expand so that the screw threads become locked together and it is difficult to unscrew the joint after use of the pole. Alternatively, the screw joint can be unscrewed during use by anti-clockwise rotation if it is not sufficiently tight.

Insert joints must be smaller than the tubes into which they are inserted, accordingly they are prone to movement within the tubes, which results in flexing of the pole and/or relative rotation of the tubes during use. Furthermore, when a pole becomes warm during use the insert can expand causing the tubes to become locked together and difficult to separate.

The present invention sets out to provide an improved joint, which prevents relative rotation of the tubes, which reduces flexing between the tubes, which can be undone, to allow decoupling of the tubes, when hot, and which is cost effective to produce.

SUMMARY OF THE INVENTION

In accordance with an aspect of the present invention, there is provided a coupling device for releasably coupling first and second axially aligned hollow tubes end to end, the coupling device comprising a substantially cylindrical body that is adapted to be received within the adjacent ends of the first and second tubes, wherein the device includes an adjustment mechanism operable for radially expanding and contracting the coupling device, and in an expanded state, the coupling device forms a friction joint with each of the tubes, locking the tubes relative to each other.

In accordance with a further aspect of the present invention, there is provided a pole dancing pole comprising a coupling device in accordance with the present invention and a first tube and a second tube arranged to be coupled together with said coupling device.

In accordance with a yet further aspect of the present invention there is provided a pole dancing pole kit comprising a coupling device in accordance with the present invention and a first and a second tube each having an end arranged to receive part of the coupling device. The pole dancing kit may comprise further parts that may be assembled with one another to form a pole dancing pole.

Further features and advantages of the invention will become apparent from the following description of preferred embodiments of the invention, given by way of example only, which is made with reference to the accompanying drawings.

DETAILED DESCRIPTION OF THE INVENTION

Figure 1:
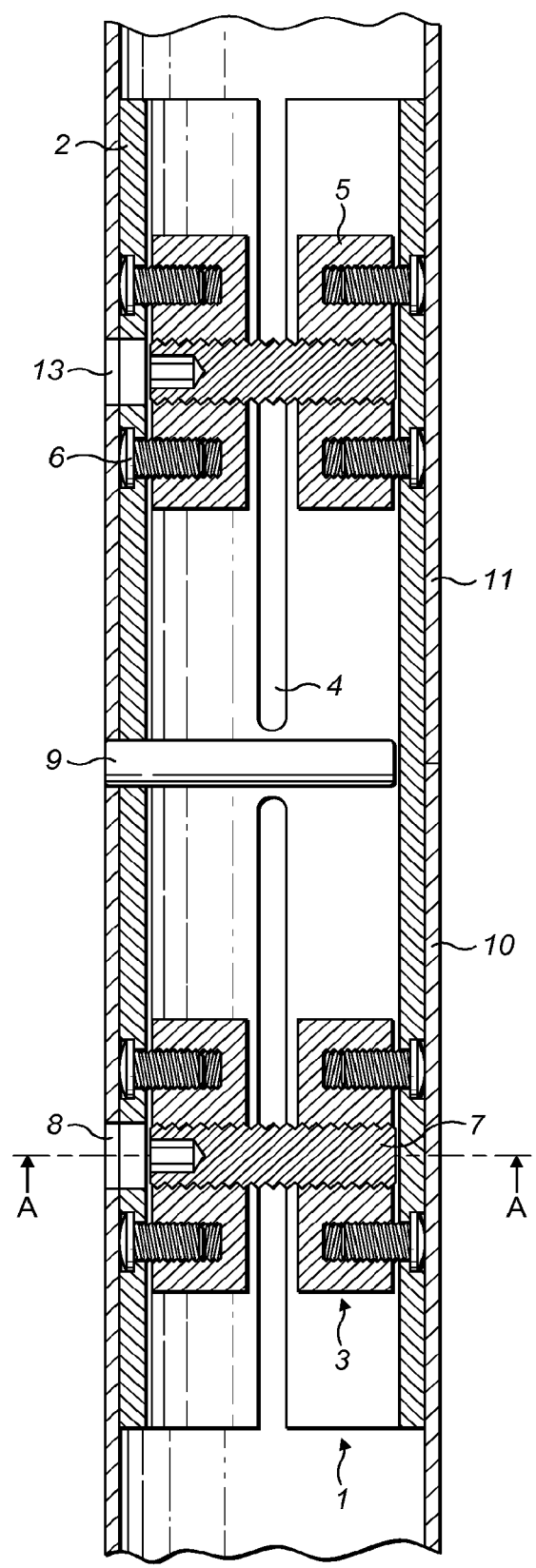
FIG. 1 shows a vertical cross-section of a coupling device, in use, according to a first embodiment of the present invention.
Figure 2:
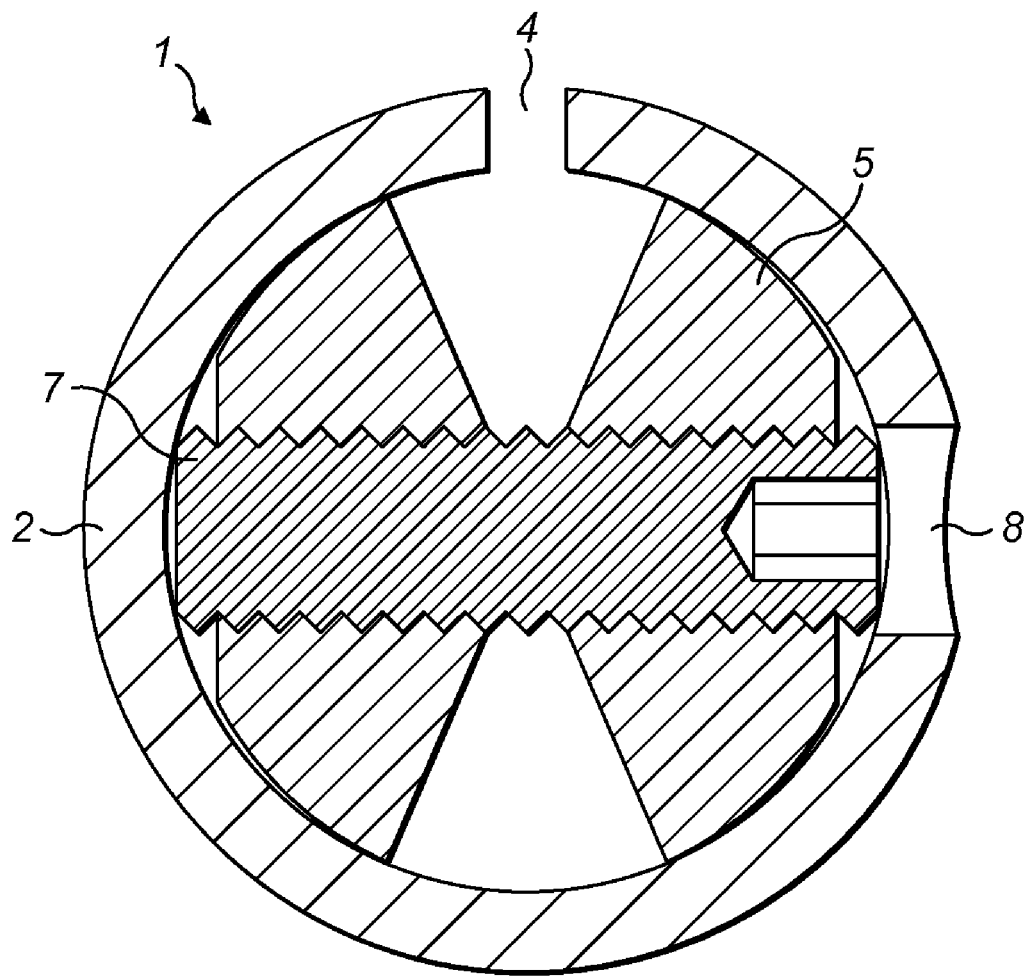
FIG. 2 shows a horizontal cross-section of the coupling element through line A-A of FIG. 1.

A coupling device 1 in accordance with an embodiment of the present invention, and shown in FIGS. 1 and 2, comprises a substantially cylindrical body 2, which in this example is a hollow cylindrical tube, and two adjustment mechanisms 3, which are operable to radially expand and contract the coupling device 1. In an expanded state the coupling device 1 forms a friction joint with tubes 10, 11 locking them relative to each other, preventing radial or axial movement. In other embodiments the body may be shaped differently from a cylindrical tube; i.e. the body may be otherwise substantially cylindrical, meaning the body has a shape which allows the coupling device to be inserted into an end of each of two tubes for coupling the two tubes together.

The cylindrical body 2 is provided with two axially extending slots 4, one extending from each end of the body 2. The slots 4 allow the effective diameter of the cylindrical body 2 to be increased or decreased by at least one of the adjustment mechanisms 3, which increases or decreases the width of the slots 4 by the application of expansive or contractive forces on circumferentially opposed points of the cylindrical body 2.

Whilst in the present embodiment a pair of slots is provided, there may be only a single slot provided that extends along the entire length of the cylindrical body 2.

Each of the adjustment mechanisms 3 comprises first and second circumferentially opposed internally threaded elements 5 and a screw member 7. The threaded elements are each fixed, preferably rigidly, to the inner face of the cylindrical body 2 by two countersunk screws 6. Having the threaded elements 5 fixed to the inner surface of the cylindrical body has the advantage of enabling the adjustment mechanism to be used to pull on the inner face of the cylindrical body and thereby contract the coupling device. Arranging the coupling device to be able to contract the cylindrical body has the advantage of avoiding the possibility of the coupling device becoming stuck in a portion of the tube due to a lack, or loss, of elasticity of the cylindrical body. Furthermore, due to different thermal expansion properties that may exist between different materials used in the coupling device and the tubes, this arrangement of adjustment mechanism avoids the coupling device becoming stuck in the tubes because of the heat generated in a pole assembly, comprising the coupling device and tubes, from the pole being used. An outer surface of each threaded element 5 conforms substantially to the inner face of the cylindrical body, as shown in FIG. 2 thus meaning the outer surface of each threaded element is arranged to contact the inner face of the body so that operation of the adjustment mechanism can expand the body.

The first and second threaded elements 5 have axially aligned opposite threads that receive the screw member 7. The screw member 7 has a single external thread and lies entirely within the profile of the cylindrical body 2. Access to the head of the screw member 7, through the outer surface of the cylindrical body 2, is provided by a through hole 8, which allows a user to turn the screw member 7 using a hand tool such as a screwdriver, Allen/Hexagon driver or similar. Since the first and second threaded elements 5 have opposite threads, rotation of the screw member 7 in one direction will pull the first and second threaded elements 5 towards one another, closing the slot 4, and rotation of the screw member 7 in the other direction will push the first and second threaded elements 7 apart, opening the slot 4. The longitudinal axis of the screw member 7 is orthogonal to the slot 4, as clearly shown in FIG. 2.

The two adjustment mechanisms 3 are provided one adjacent each end of the cylindrical body 2. By virtue of this arrangement, rotation of the upper (first) screw member 7 opens and closes the first slot at the first end and rotation of the lower (second) screw member 7 opens and closes the second slot at the second end. This is advantageous since only one adjustment mechanism need be operated to decouple the hollow tubes 10, 11 and the coupling element 1 may be retained in the hollow tube adjacent the other adjustment mechanism ready for the next time the tubes 10, 11 are to be coupled.

Whilst in the present embodiment two adjustment mechanisms are provided, there may alternatively be a single adjustment mechanism 3 or more than two adjustment mechanisms. For example, in the case where a single slot 4 is provided that extends along the entire length of the cylindrical body 2 there may be a single adjustment mechanism 3 provided in a longitudinally central region of the cylindrical body 2. In a further simplified arrangement, the or each adjustment mechanism 3 may comprise a single internally threaded element 5, which is fixed, preferably rigidly, to the inner face of the cylindrical body 2, and a screw member 7. In this case the screw member 7 will contact the inner face of the cylindrical body 2, such that turning the screw in one direction will open the slot 4, by extension of the screw member 7 against the inner face of the cylindrical body 2, and turning the screw in the other direction will close the slot 4, by retraction of the screw member and reduction of the pushing force on the inner face of the cylindrical body 2. In any of the described embodiments the adjustment mechanism need not be fixed to the inner face of the cylindrical body 2 by screws, it may be fixed by welding or similar.

The cylindrical body 2 is provided on its outer surface, in a longitudinal central region, with a radially extending location pin 9. The pin 9 extends from within the cylindrical body 2 through a hole provided in the outer surface of the cylindrical body 2. The pin 9 extends beyond the outer surface of the cylindrical body 2 by a distance that is substantially equal to the wall thickness of each of the first and second hollow tubes 10, 11, so that it lies flush with the outer surface of each of the tubes 10, 11, as shown in FIG. 1. The pin is cylindrical. Each of the first and second tubes is provided with a notch in its end face that is adapted to engage the pin 9. The notch in each tube is semi-circular and engages half of the circumference of the pin 9 and thereby advantageously prevents rotation of one tube with respect to the other tube when the coupling device is used to connect the two tubes to one another. The end faces of the tubes 10, 11 abut each other, and the outer surfaces of the tubes 10, 11 lie flush, so that the pole is provided with a substantially continuous smooth outer surface.

The tubes 10, 11 are further provided with holes 13 that provide access to the screw members 7, through holes 8, for opening and closing the slot 4. The pin is operable to prevent the coupling element from sliding down within either of the tubes 10, 11 when it is inserted into the tubes 10, 11 and ensures alignment of the holes 8 and the holes 13, so that the screw members 7 may be accessed when the coupling device 1 is located within the tubes 10, 11 as shown in FIG. 1.

The operation of the coupling device 1 according to the present embodiment will now be described.

In order to couple together two tubes 10, 11, which form at least part of a dance exercise pole assembly, the coupling device 1, in a contracted state, is inserted into the end of the first tube 10 and the location pin 9 is located within the notch of the first tube 10. With a tool, the screw member 7 of the first adjustment mechanism 3 is rotated to open the first slot, increasing the effective diameter of the cylindrical body 2 at the first end and forming a friction joint with the first tube 10. Next, the portion of the coupling device 1 that is exposed from the end of the first tube 10 is inserted into the end of the second tube 11 and the location pin 9 is located within the notch of the second tube 11 with the ends of the first and second tubes 10, 11 brought into abutment. Finally, the screw member 7 of the second adjustment mechanism 3 is rotated to open the second slot 4, increasing the effective diameter of the cylindrical body 2 at the first end and forming a friction joint with the second tube 11. The tubes 10, 11 are locked together and relative axial or rotational movement is not possible.

Since the coupling device 1 is insertable into the ends of the tubes 10, 11 in a contracted state it is easy to insert, yet once inserted and expanded it provides a strong friction joint that prevents relative rotational and axial movement of the tubes 10, 11.

In order to de-couple the first and second tubes 10, 11 the screw member 7 of the second adjustment mechanism 3 is rotated to close the second slot 4, reducing the effective diameter of the cylindrical body 2 at the second end, releasing the friction joint with the second tube 11 and allowing for removal of the coupling device 1 from the end of the second tube 11, thereby allowing for decoupling of the tubes 10, 11.

The coupling device 1 may remain within the end of the first tube 10 for the next time the tubes are to be coupled. Alternatively, the coupling device may be left in the second tube 11 and removed from the end of the first tube 10. Both screw members 7 can be operated for removal of the coupling device 1 from the ends of both tubes 10, 11.

Since the coupling device 1 is contracted prior to removal, even if it has heated up and expanded during use it is easy to remove.

Figure 3:
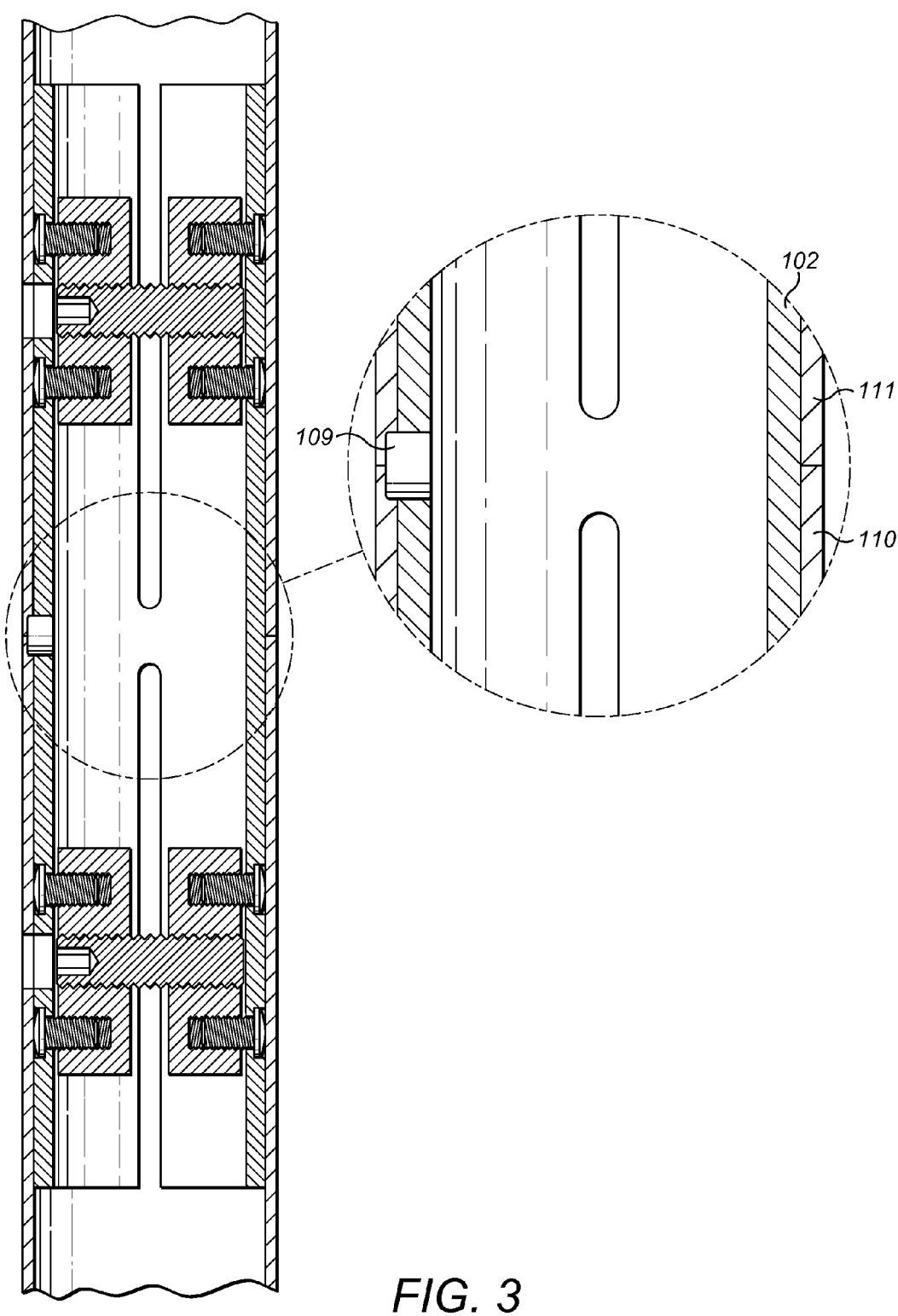
FIG. 3 shows a vertical cross-section of a coupling device, in use, according to a second embodiment of the present invention.

FIG. 3 shows a second embodiment of the invention. The second embodiment is substantially the same as the above described first embodiment, the only difference being the arrangement of the radially extending location pin 109 and the associated notches provided in the end faces of the tubes 110, 111. Accordingly, only the different features are discussed below. It should be noted that the arrangement of the pin 109 and notches described below may replace the arrangement of the pin 9 and notches in the first embodiment.

In contrast to the first embodiment, the pin 109 does not extend beyond the inner surface of the cylindrical body 102, and extends beyond the outer surface of the cylindrical body 102 by a distance that is less than the wall thickness of each of the first and second hollow tubes 110, 111. Each of the first and second hollow tubes 110, 111 is provided with a notch in its end face that is adapted to engage the pin 109. The notches are provided on the inner surfaces of the tubes 110, 111 and do not extend through the walls of the tubes 110, 111, they extend from the inner surfaces of the tubes 110, 111 by a distance that is substantially equal to the distance that the pin 109 protrudes from the outer surface of the cylindrical body 102. The notch in each tube is semi-circular and engages half of the circumference of the pin 109. The end faces of the tubes 110, 111 abut each other, and the outer surfaces of the tubes 110, 111 lie flush, so that the pole is provided with a substantially continuous smooth outer surface, meaning that the transition between the outer surface of one tube to the outer surface of the other tube is sufficiently smooth to avoid any injury from the ends of the tubes to a person using the pole assembly, and preferably to avoid any interference with a person's use of the pole assembly.

Since, in this embodiment the hollow tubes 110, 111 are not provided with notches that extend through their walls, but rather with internal notches, each tube is provided with a continuous outer surface.

The operation of the coupling device of the second embodiment is identical to the operation of the first embodiment of the invention.

The above embodiments are to be understood as illustrative examples of the invention. Further embodiments of the invention are envisaged. For example, the arrangement of the pin 9, 109 and notches is not limited to a pin, it may comprise a woodruff key or similar. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A coupling device arranged to releasably couple first and second axially aligned hollow tubes of a dance exercise pole end to end, the coupling device comprising:
   a substantially cylindrical hollow body having first and second longitudinal ends that is arranged to be received within an end of the first and second tubes, the body comprising at least one slot and a through hole extending through a wall of the body adjacent each respective longitudinal end; and
   an adjustment mechanism disposed within each end of the body operable for radially expanding and contracting the coupling device, and when in an expanded state, the coupling device is arranged to form a friction joint with each of the tubes, locking the tubes relative to each other,
   each adjustment mechanism including first and second internally threaded elements fixed by fasteners to an inner face of the body on opposing sides of the slot, and a screw member received by each of the first and second internally threaded elements, the first and second internally threaded elements having axially aligned opposite threads that receive the screw member and are axially aligned with a respective one of the through holes so that the screw member may be accessed with a tool for turning the screw member,
   whereby rotation of the screw member in one direction pulls the first and second internally threaded elements towards one another, the first and second internally threaded elements being fixed to the inner face of the body so as to pull on the body when the screw member is rotated in said one direction, thereby closing the slot and radially contracting the body, and
   whereby rotation of the screw member in the other direction pushes the first and second threaded elements apart, thereby opening the slot and radially expanding the body.

2. A coupling device as claimed in claim 1, wherein the at least one slot comprises a single slot which extends along the entire length of the body.

3. A coupling device as claimed in claim 1, wherein the at least one slot comprises two slots, one extending from each end of the body.

4. A coupling device as claimed in claim 1, in combination with first and second tubes, wherein the body is provided on its outer surface with a radially extending location pin and the first and second hollow tubes are provided in their end faces with notches that are adapted to engage the pin.

5. The combination as claimed in claim 4, wherein the first and second tubes are provided with holes that, in use, are aligned with a respective one of the screw members provided for opening and closing the slot.

6. The combination as claimed in claim 4, wherein the radially extending location pin is provided in a longitudinal central region on the outer surface of the body.

7. The combination as claimed in claim 6, wherein the first and second tubes of the combination are provided with holes that, in use, are aligned with a respective one of the screw members provided for opening and closing the slot.

8. A dance exercise pole comprising the coupling device as claimed in claim 1 and a first tube and a second tube arranged to be coupled together with said coupling device.

9. The dance exercise pole of claim 8, wherein the first and second tubes each have an end arranged to receive part of the coupling device.

10. A dance exercise pole kit comprising the coupling device as claimed in claim 1, and a first tube and a second tube arranged to be coupled together with said coupling device.

11. The dance exercise pole kit of claim 10, wherein the first and second tubes each have an end arranged to receive part of the coupling device.

12. A coupling device as claimed in claim 1, comprising a pin extending beyond an outer surface of the body.

13. A coupling device as claimed in claim 12, wherein the pin comprises a radially extending location pin.

14. A coupling device arranged to releasably couple first and second axially aligned hollow tubes end to end, the coupling device comprising:
   a substantially cylindrical hollow body having first and second longitudinal ends that is arranged to be received within an end of the first and second tubes, the body comprising at least one aperture and a through hole extending through a wall of the body adjacent each respective longitudinal end; and
   an adjustment mechanism disposed within each end of the body operable for radially expanding and contracting the coupling device, and when in an expanded state, the coupling device is arranged to form a friction joint with each of the tubes, locking the tubes relative to each other,
   each adjustment mechanism including first and second internally threaded elements fixed by fasteners to an inner face of the body on opposing sides of the aperture, and a screw member received by each of the first and second internally threaded elements, the first and second internally threaded elements having axially aligned opposite threads that receive the screw member and are axially aligned with a respective one of the through holes so that the screw member may be accessed with a tool for turning the screw member,
   whereby rotation of the screw member in one direction pulls the first and second internally threaded elements towards one another, the first and second internally threaded elements being fixed to the inner face of the body so as to pull on the body when the screw member is rotated in said one direction, thereby closing the aperture and radially contracting the body, and
   whereby rotation of the screw member in the other direction pushes the first and second threaded elements apart, thereby opening the aperture and radially expanding the body.

15. A coupling device according to claim 14, wherein the aperture is a slot.

* * * * *